April 12, 1966     K. BREER ETAL     3,245,661
MIXING HEAD FOR THE PRODUCTION OF PLASTICS
Filed Oct. 11, 1961
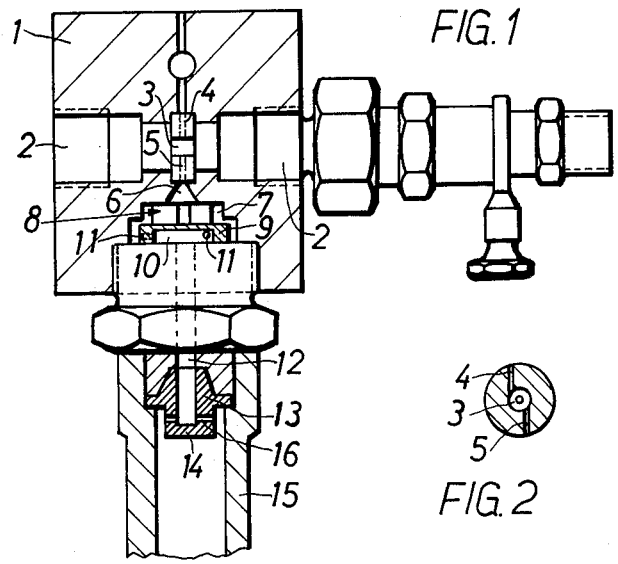
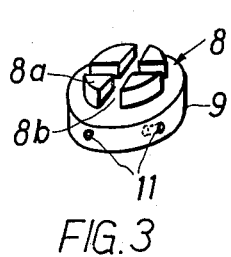
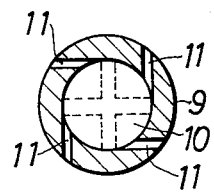
INVENTORS:
KARL BREER, ERWIN WEINBRENNER, PETER HOPPE.
BY
ATTORNEY United States Patent Office 3,245,661
Patented Apr. 12, 1966

3,245,661
MIXING HEAD FOR THE PRODUCTION OF PLASTICS
Karl Breer, Cologne-Flittard, Erwin Weinbrenner, Leverkusen, and Peter Hoppe, Troisdorf, Germany, assignors to Farbenfabriken Bayer Aktiengesellschaft, Leverkusen, Germany, a corporation of Germany
Filed Oct. 11, 1961, Ser. No. 144,385
Claims priority, application Germany, Apr. 15, 1955, F 17,341; May 7, 1956, F 20,238; May 11, 1956, F 20,268; Oct. 25, 1960, F 19,230
3 Claims. (Cl. 259—4)

This application is a continuation-in-part of copending application Serial No. 657,319, filed May 6, 1957, now Patent No. 3,073,533, which is a continuation-in-part of application Serial No. 596,117, filed July 5, 1956, now abandoned.

This invention relates to a device for mixing chemical reactants together for the production of plastics, more especially foam materials containing polyurethane groups.

It is an object of this invention to provide an improved mixing apparatus for the preparation of plastics. It is a further object of this invention to provide a mixing apparatus for intimately and rapidly mixing the reaction components used in the preparation of plastics. It is another object of this invention to provide an apparatus for rapidly mixing the reaction components of a polyurethane plastic. It is still another object of this invention to provide an apparatus for mixing the reaction components of a cellular polyurethane plastic which apparatus will control the cell size.

The foregoing objects and others are accomplished in accordance with this invention, generally speaking, by providing a mixing head for the production of plastics comprising a housing, a mixing chamber in the housing provided with injection nozzles and injection openings facing one another in spaced relation, the chamber opening laterally into an enlarged discharge duct, the discharge duct opening into a space which increases in steps outwardly, a spinner in the space which carries on the side facing the discharge duct a cylindrical attachment with intersecting grooves and of a diameter reduced in relation to the space and which has an eddy chamber on the thicker portion on the side opposite the grooves and which is also of a reduced diameter in relation to the space, the eddy chamber having tangential bores opening thereinto and having a discharge pipe with a passage connected thereto.

The mixing head comprises a housing in which are arranged injection nozzles with oppositely directed injection openings and between which is formed a mixing chamber opening laterally into an enlarging discharge duct. In such a mixing head, which is preferably designed to be portable, the reaction components are injetced under pressure by means of injection pumps (which are connected by flexible pressure lines to the injection nozzles), and through oppositely directed nozzle openings into the mixing chamber which is situated between the openings and which has a capacity of at least approximately 0.1 cc.; the mixture leaves the chamber through a laterally adjoining discharge duct in order to be introduced outside the latter into molds or the like, where it solidifies to form the finished foam material elements.

In order to be able to modify the pore structure of the finished foam material element as required, a supplementary mixing device is connected after the mixing chamber. According to the invention, the discharge duct of the mixing chamber opens into a space, the cross-section of which increases in steps in an outward direction, and in which is fitted a spinning element. The spinning element carries, on the side facing the duct, a cylindrical attachment which is of smaller diameter than the said space. Intersecting grooves are formed in the cylindrical attachment and an eddy space is formed on the side opposite the grooved attachment. The eddy space is of smaller diameter than the stepped space and tangential bores open into the stepped space to which a discharge pipe is connected. Arranged in the discharge pipe is a cup shaped deflecting unit which is open on the side facing the spinner and is provided above the closed base with lateral openings. The supplementary mixing device permits the pore size of the final product to be influenced by the size and number of the tangentially arranged bores in the spinner. Thus constant, larger or smaller discharge quantities (for example 0.1 to 30.0 kg./min.), can be obtained. For small quantities of mixture (0.1 to 10 kg./min.), 2–4 bores are provided whereas for larger quantities (above 20 kg./min.), 4–8 bores will be provided. The diameters of the tangential bores are chosen as 1–2 mm. for small quantities and 2–4 mm. for large quantities. For constant mixing quantities, a small total cross-section of all bores provided in the spinner, for example a plurality (such as 4) of extremely small bores, causes a very fine pore formation in the finished foam because of the more intensive final homogenization of the reaction mixture produced thereby, whereas a plurality (2, 3 or 4) of large bores with a diameter of for example 4 mm. permits the production of a foam material with coarse pores.

The deflector intercepts the reaction mixture, which is rotating after having passed through the spinner, and guides it around and over the base of the deflector radially towards the walls of the outlet pipe of the mixing head, so that a uniformly tension free discharge of the mixture is produced in the direction of the axis of the discharge pipe.

One embodiment of the invention is shown diagrammatically and by way of example in the drawing in which:

FIGURE 1 shows the mixing head in longitudinal section, FIGURE 2 is a cross-section through the mixing chamber between the nozzles, FIGURE 3 shows the spinner in perspective and FIGURE 4 is an underneath view of the said spinner.

A mixing head housing 1 is provided with two high pressure injection nozzles 2 which open into a cylindrical mixing chamber 3. A tangentially arranged bore 4 for supplying compressed air also opens into the chamber 3. A radially arranged discharge passage 5 for the outlet of the mixture extends from the chamber 3 (see FIGURE 2) while a conical discharge duct 6 opening into a space 7, adjoins the said passage. Fitted into the space 7 is a spinner 8 and, following the latter, a discharge pipe 12 leads from the space 7. After discharge of the mixture from the bore 5 and passage 6, it is guided over the spinner 8, the intersecting grooves 8b of the spinner 8 distributing the mixture uniformly over the upper rim of projecting part 9 of the spinner and through tangentially arranged bores 11 into a cavity (eddy space 10) of the spinner. The mixture leaving the eddy space of the spinner passes through the bore 12 of the mixing head on to base 14 of a deflector 13, from whence it is conducted perpendicularly towards the walls of discharge pipe 15 through radially arranged bores 16.

Although the invention has been described in considerable detail in the foregoing for the purpose of illustration it is to be understood that such detail is solely for this purpose and that variations can be made therein by those skilled in the art without departing from the spirit and scope of the invention except as is set forth in the claims.

What is claimed is:
1. A mixing head for the production of plastics comprising a housing, a mixing chamber in the housing pro- vided with injection nozzles and injection openings facing one another in spaced relation, said chamber opening laterally into a discharge duct the diameter of which increases as the distance from said chamber increases, said discharge duct opening into a space defined by walls of said housing the diameter of which increases in steps, a spinner disposed within said space and of a diameter smaller than said space, said spinner having on the side facing the discharge duct a cylindrical attachment with intersecting grooves, said attachment having a diameter less than that of said space so the combination of the attachment and the spinner increases in steps to correspond to the configuration of said space defined by said walls to thereby form an annular chamber between said spinner together with said attachment and the walls of said space, said spinner having an eddy chamber on the side opposite the attachment, said eddy chamber having a diameter less than that of said space, said eddy chamber having tangential bores opening thereinto and having a discharge pipe with a passage connected thereto.

2. The mixing head of claim 1 wherein said mixing chamber is provided with an inlet arranged tangentially for the introduction of compressed air.

3. A mixing head to claim 1, wherein a cup shaped deflector is arranged in the discharge pipe, the said deflector being open on the side facing the spinner and being formed above its closed base with lateral openings.

References Cited by the Examiner
UNITED STATES PATENTS

| | | |
|---|---|---|
| 1,676,237 | 7/1928 | Baker. |
| 2,653,801 | 9/1953 | Fontein et al. _____ 259—4 |
| 2,890,868 | 6/1959 | Potchen _____ 259—4 |
| 3,073,533 | 1/1963 | Weinbrenner et al. ___ 239—399 |

WALTER A. SCHEEL, *Primary Examiner.*

LEO QUACKENBUSH, *Examiner.*